(12) United States Patent
Tulbek et al.

(10) Patent No.: US 11,503,846 B2
(45) Date of Patent: Nov. 22, 2022

(54) PULSE-BASED BREAD CRUMB, COATING AND PRE-DUST ANALOG PROCESS FOR MANUFACTURING THE SAME

(71) Applicant: AGT Food and Ingredients Inc., Regina (CA)

(72) Inventors: Mehmet Tulbek, Regina (CA); Davide Vitale, Regina (CA); Les Knudson, Regina (CA); Eric Bartsch, Regina (CA)

(73) Assignee: AGT Food and Ingredients Inc., Regina (CA)

( * ) Notice: Subject to any disclaimer, the term of this patent is extended or adjusted under 35 U.S.C. 154(b) by 43 days.

(21) Appl. No.: 16/510,120

(22) Filed: Jul. 12, 2019

(65) Prior Publication Data

US 2020/0015502 A1    Jan. 16, 2020

Related U.S. Application Data

(60) Provisional application No. 62/697,838, filed on Jul. 13, 2018.

(51) Int. Cl.
| | |
|---|---|
| *A23K 20/158* | (2016.01) |
| *A23K 50/75* | (2016.01) |
| *A23L 11/00* | (2021.01) |
| *A23P 20/10* | (2016.01) |
| *A23D 7/01* | (2006.01) |

(52) U.S. Cl.
CPC .............. *A23L 11/05* (2016.08); *A23P 20/10* (2016.08); *A23V 2002/00* (2013.01)

(58) Field of Classification Search
None
See application file for complete search history.

(56) References Cited

U.S. PATENT DOCUMENTS 5,989,620 A    11/1999    Wang et al.

FOREIGN PATENT DOCUMENTS

| | | | |
|---|---|---|---|
| CA | 1076412 | 4/1980 | |
| CA | 1118270 | * 2/1982 | ............... A23J 1/14 |
| CN | 1049269 | 2/1991 | |
| EP | 2725924 | 5/2014 | |
| WO | 2015/158959 | 10/2015 | |
| WO | 2016/120234 | 8/2016 | |

OTHER PUBLICATIONS

Chen, Breadings, Batters and Breadings, 2nd ed., Chapter 10, 2011.*
International Search Report & Written Opinion of the international searching authority PCT/CA2019/050962 Sep. 19, 2019.

* cited by examiner

*Primary Examiner* — Donald R Spamer
*Assistant Examiner* — Philip A Dubois
(74) *Attorney, Agent, or Firm* — Bradley J. Thorson

(57) ABSTRACT

Pulse-based bread crumbs, coatings, and pre-dust products having an improved taste, texture and end use properties. The bread crumb, coating, and pre-dust products are produced by heat and moisture treatment at 100% by dry weight with pulse flours, e.g. pea flour, lentil flour, chickpea flour, faba bean flour, navy bean flour, pinto bean flour, black eye bean flour and black bean flour.

10 Claims, 6 Drawing Sheets

PULSE-BASED BREAD CRUMB, COATING AND PRE-DUST ANALOG PROCESS FOR MANUFACTURING THE SAME

CROSS-REFERENCE TO RELATED APPLICATION

This application claims priority to U.S. Prov. App. No. 62/697,838 filed on Jul. 13, 2018, the entire contents of which are explicitly incorporated herein by reference.

TECHNICAL FIELD

The invention relates to the field of bread crumb coatings and pre-dust production, in particular, to pulse-based bread crumb coating and pre-dust production.

BACKGROUND

In general bread crumb, coating, and pre-dust products are produced by granulating or pulverizing cracker or bread made of wheat flour by baking process. Traditionally bread or sheeted crackers are used as base ingredient and milled to produce granulated crumbs and powders in formulated systems. Wheat flour, salt, sugar, bicarbonate salts, and vegetable oils are added in formulation to improve the sheeting and baking processes and in addition to enhance taste and sensory properties.

Wheat flour and other grain-based flours are mixed with water and variable ingredients such as salt, sugar, yeast, bicarbonate salts, and vegetable oils. After the mixing process, the dough is hydrated with a water absorption range of 55-63%. The hydrated dough is sheeted as thin sheeted cracker dough and baked further at a range of 200-240° C. The moisture is reduced down to 12-14% and then baked cracker particles are milled into variable granulations from coarse (i.e. >500 micron), granular (i.e. 500-150 micron), and fine (i.e. <150 micron) particle size.

Other methods such as extrusion can be also used to produce bread crumbs, coating, and pre-dust products. Wheat flour, corn flour, and other flours can be extruded into hard crust pellet, and are then milled into granulated crumb and powder products.

The wheat flour and other grain based flours are hydrated with water and variable ingredients such as salt, sugar, yeast, bicarbonate salts, and vegetable oils. In an extruder, the dough particles are hydrated with a water absorption range of 20-45%. The hydrated dough is extruded within a die at a temperature range from 120° C. to 160° C. During extrusion process, the moisture is reduced down less than 12% and then extruded dried dough particles were milled into variable granulations from coarse (i.e. >500 micron), granular (i.e. 500-150 micron), and fine (i.e. <150 micron) particle size.

A process for the production of legume meal is described in W.O. Pub. No. 2016/120234 to Ambiente E Nutrizione S. R. L. The process comprises the steps of: a) providing a wet heat treatment reactor comprising a cylindrical tubular body with horizontal axis, having an opening for the introduction of legume meal and water or an aqueous solution and having at least one discharge opening, a heating jacket and a rotor arranged inside the cylindrical tubular body; b) feeding a continuous flow of meal into the reactor, in which the rotor is rotated at a speed greater than or equal to 150 rpm; c) feeding into the reactor, together with the flow of meal, a continuous flow of water or aqueous solution, which is dispersed into minute droplets; d) centrifuging the aforementioned flows against the inner wall of the reactor, thus forming a highly turbulent, dynamic, thin tubular fluid layer, while advancing in substantial contact with the inner wall of the reactor towards the discharge opening; e) discharging from the discharge opening a continuous flow of a wet meal (moisture content 20-40%); f) providing a thermal dehydration and treatment reactor, comprising a cylindrical tubular body with horizontal axis, having at least one inlet opening and at least one discharge opening, a heating jacket and a rotor arranged inside the cylindrical tubular body and comprising a shaft provided with elements projecting radially therefrom; g) feeding the wet meal into the thermal dehydration and treatment reactor, the inner wall of the reactor being kept at a temperature of at least 100° C. and the rotor being rotated at a speed of at least 150 rpm; h) centrifuging and causing the wet meal to advance inside the reactor by the action of the rotor; i) discharging from the discharge opening of the reactor a continuous flow of legume meal having a moisture content of between 2% and 15%.

SUMMARY

The aspects as described herein in any and all combinations including, but not limited to a method of manufacturing a pulse-based bread crumb, coating, or pre-dust from pulses. The method may comprise: separating, using classification, a raw pulse flour into a limited protein pulse flour fraction having a limited protein range of less than about 16% protein by weight and a medium protein pulse flour fraction having a medium protein range of about 20% to about 36% by weight; hydrating, in a reactor, the limited protein pulse flour fraction and the medium protein pulse flour fraction is blended from a protein range from 7-24%. to between about 18% to about 55% by weight with water having a water temperature range of about 30° C. to 90° C. at atmospheric pressure to produce a hydrated pulse dough having a dough temperature range of about 70° C. to about 85° C.; agglomerating the hydrated pulse dough to produce agglomerated pulse dough; heating the agglomerated pulse dough at 95° C. to 150° C. cooked and dried to a moisture content of less than about 12% moisture; sifting the agglomerated pulse dough into coarse pieces of over about 2362 micron size, granular pieces of between about 297 to about 2362 micron size, and fine pieces of less than about 297 micron; and/or producing a food product using at least one of the course pieces, the granular pieces, and the fine pieces.

The method may further comprise milling at least one dehulled pulse to produce the raw pulse flour. The method may further comprise dehulling at least one hulled pulse prior to milling to produce the at least one dehulled pulse and at least one outer hull. The method may further comprise cleaning the at least one hulled pulse.

The raw pulse flour may comprise particle sizes at least one of: below about 80 microns; and/or below about 150 microns. A protein range of the pulse flour fraction may be less than 16% by dry weight. The protein range of the pulse flour fraction may be in a range of 7% to 36% by dry weight.

The method may further comprise producing a food product by applying the at least one of the course pieces, the granular pieces, and the fine pieces to an exterior surface of the food product. The food product may be selected from at least one of chicken, shrimp, fish, potatoes, meat analogues, texturized analogues, canned analogues, vegetables, fruits, and pickles.

The method may further comprise producing the food product by binding the at least one of the course pieces, the granular pieces, and the fine pieces within the food product.

The food product may be selected from at least one of sausage, meatballs, snack foods, and bakery products.

The aspects as described herein in any and all combinations including, but not limited to a pulse-based bread crumb, coating, or pre-dust produced from pulses comprising: a protein content in a range from about 7% to about 36% by weight; a carbohydrate content in a range of about 35% to about 70% by weight; and a moisture content of less than about 12% by weight. The pulses may be selected from at least one of peas, lentils, chickpeas, faba beans, navy beans, pinto beans, black beans, blackeye beans, and any combination thereof.

The pulse-based bread crumb, coating, or pre-dust may be applied as a coating to a food product at an inclusion rate from 1% to 10% by weight. The food product may be selected from at least one of chicken, shrimp, fish, potatoes, meat analogues, texturized analogues, canned analogues, vegetables, fruits, and pickles. The pulse-based bread crumb, coating, or pre-dust may comprise a binder in sausage, meatballs, snack foods, and bakery products at an inclusion rate from 1% to 20%.

The aspects as described herein in any and all combinations including, but not limited to a pulse-based bread crumb, coating, or pre-dust produced from pulses comprising: a protein content of less than about 16% by weight; a carbohydrate content of about 70% by weight; and a moisture content of less than about 12% by weight. The pulses may be selected from at least one of peas, lentils, chickpeas, faba beans, navy beans, pinto beans, black beans, blackeye beans, and any combination thereof. The pulse-based bread crumb, coating, or pre-dust may be applied as a coating to a food product at an inclusion rate from 1% to 10% by weight. The food product may be selected from at least one of chicken, shrimp, fish, potatoes, meat analogues, texturized analogues, canned analogues, vegetables, fruits, and pickles. The pulse-based bread crumb, coating, or pre-dust according to claim 18, wherein the pulse-based bread crumb, coating, or pre-dust may comprise a binder in sausage, meatballs, snack foods, and bakery products at an inclusion rate from 1% to 20%.

BRIEF DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

FIG. 1 is a flowchart for producing a pulse-based bread crumb and the like;

DETAILED DESCRIPTION OF THE DRAWINGS

There has been a recent increase in gluten-related disorders, such as celiac disease, non-celiac gluten sensitivity, wheat allergy, gluten ataxia, and dermatitis herpetiformis. This has been particularly problematic as some meats, etc. may be coated or bound with gluten-based products further limiting food selection for people with gluten-related disorders. As knowledge of these gluten-related disorders has increased, there has been a corresponding increase in the interest for gluten-free products. Example products may comprise gluten-free bread crumbs, powders, grains, and/or flakes.

Most conventional bread crumb coating contains some amount of gluten, especially if it is made from durum wheat flour. Pulse-based bread crumbs may be suitable for gluten-free and allergen-free applications that may be consumed by celiac patients, non-celiac gluten allergy, and gluten sensitive consumers. Pulse-based bread crumbs may be produced from pulses, such as, for example, peas, lentils, and faba beans. However, pulse flour and the pulse-based bread crumbs made therefrom may have an unappealing aftertaste for some consumers. By using processed pulse flours and specifically pulse flours processed using heat and moisture treatment as described herein, the process may produce improved taste, flavor, appearance, and sensory properties in comparison with the conventional bread crumb, powder, grain, and/or flakes.

Figure 1:
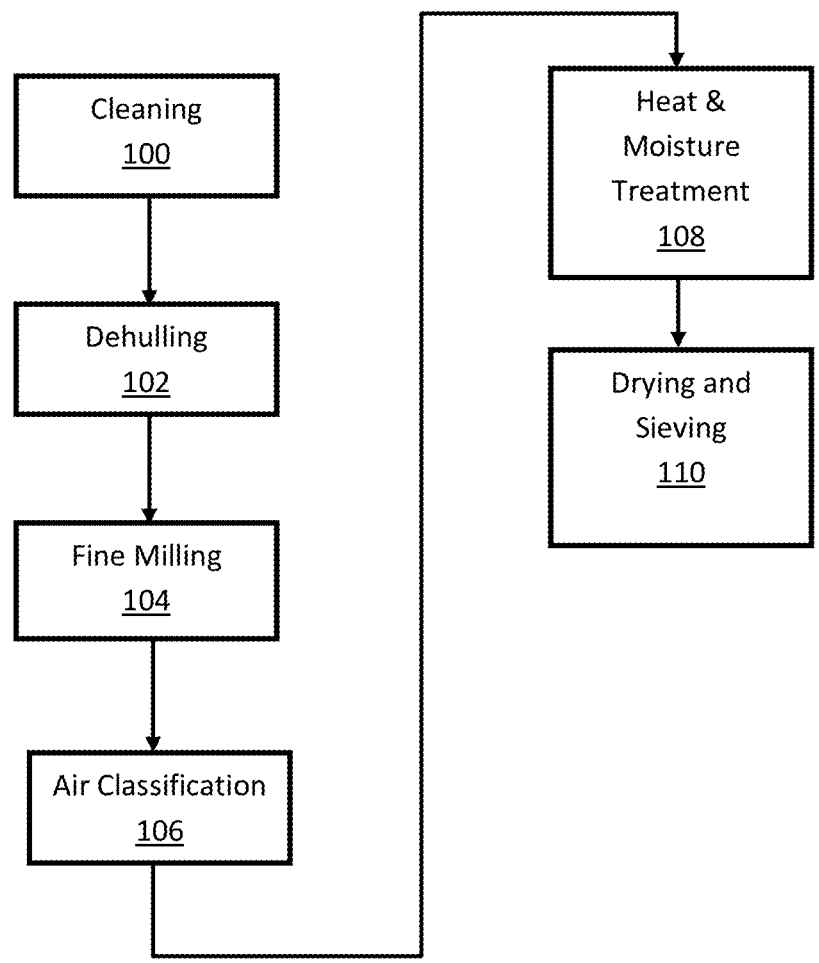

Low protein and medium protein pulse flours may produce a bread crumb, coating, and/or pre-dust analog by using a combination of steam, water, and/or heat in a reactor as a single allergen-free pulse-based ingredient as described further with reference to FIG. 1. Pulse flours may be produced by cleaning 100, dehulling, 102, fine milling/grinding 104, classification 106, heat and moisture treatment 108, and drying and milling processes 110 in which the flow, taste, and/or sensory properties of the flour may be enhanced as described herein. For example, bread crumbs, powders, grains, and/or flakes made according to the process of FIG. 1 may exhibit a reduced pulse flavor. Although the aspects described herein are directed to peas, one or more of these techniques may equally apply to other pulses, such as, but not limited to, lentils, faba beans, navy beans, pinto beans, and/or black beans (or any combination thereof).

The cleaning process 100 may be applied to remove impurities from whole peas so that product cleanliness may be sustained. During the cleaning process 100, impurities such as chaff, other crops, stones, black-off colour kernels, damaged and/or broken seeds may be removed.

Dehulling 102 may be applied to produce dehulled pulses (e.g. split peas, split lentils, or split faba beans) and to remove outer hulls so that outer fiber portion of the peas may be removed to remove the fiber and to increase the yield of protein and starch separation. The outer hulls may be removed in the dehulling process 102 using mechanical forces applied by peelers. Since the hulls adhere on a cotyledon on the outer part of a kernel, these forces may help remove the outer hulls from the whole kernel and separate cotyledon.

Fine milling 104 process may be applied to the split peas to produce a raw pulse flour with a particle size of below about 80 microns. The particle size of below about 80 microns may assist in classification 106 in order to separate a starch fraction from a protein fraction. This particle size may apply particularly to peas, lentils, faba beans, and/or other low fat pulse crops. The fine milling 104 process may use various systems such as, for example, a pin mill, an ACM mill, a turbo jet mill, and/or other fine grinding systems. The lower particle size of the raw pulse flour may assist separation of the protein and starch granule. At this fine particle size, the protein bodies may be removed from starch granules using such techniques as described in at least U.S. Pat. No. 1,861,248 to Stebbins or U.S. Pat. No. 3,089,595 to Alpine Ag Maschinenfabrik Und.

During classification 106, the raw pulse flour may be separated into a limited protein pulse fraction with a protein range of less than about 16% dry weight. The medium protein pulse fraction having over between about 20% to about 36% dry weight protein may also be used within blending systems in processing. The classification 106 may be performed by a classifier such as produced by Hosokawa Alpine Aktiengesellschaft, Sturtevant, etc.

Rather than classification 106, the limited protein pulse fraction may comprise medium (20-32%) level pulse flours (after fine milling 104) and may be blended with pea, lentil, and/or faba bean starch isolates (e.g. starch content >97% and protein <3%). Pulse starch isolate may be used as texturizing agents combined with medium protein pulse flours to establish protein levels at a range of 7-16%.

Heat and moisture treatment 108 may be applied to improve sensory and flavor attributes of the limited protein pulse flour fraction. The limited protein pulse flour fraction may also be agglomerated as part of the heat and moisture treatment 108. In some aspects, the agglomeration may be performed with a press mixer kneader operating in a range of about 80-rpm to about 130-rpm. The initial moisture content of the limited protein pulse flour fraction before hydration may be between about 4% to about 12% and may be measured prior to hydration in order to determine the amount of hydration required.

In some aspects, the limited protein pulse fraction may be hydrated at a range from about 18% to about 55% by weight with water in a temperature range of about 30° C. to 90° C. at atmospheric pressure to produce a hydrated pulse dough crumbles with a temperature range of about 70° C. to about 85° C. The high temperature water and/or high pressure steam may be added and mixed to produce agglomerated pulse dough. The agglomerated dough may be heated to a temperature of between about 95° C. to about 150° C. to cook and dry the agglomerated pulse dough to a moisture content of less than about 12% moisture.

Figure 2:
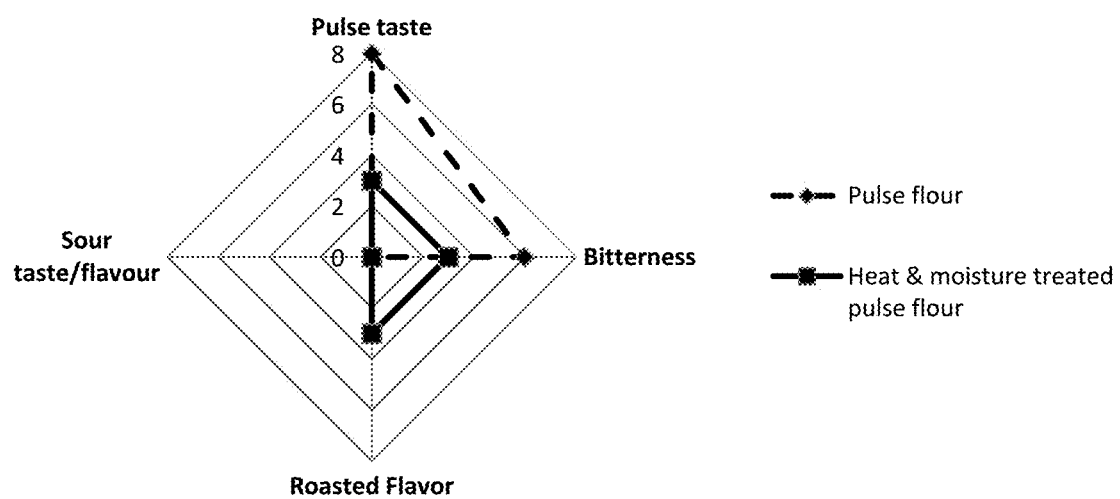
FIG. 2 is a sensory evaluation comparison of a pulse flour to a heat and moisture treated pulse-based flour.
Figure 3:
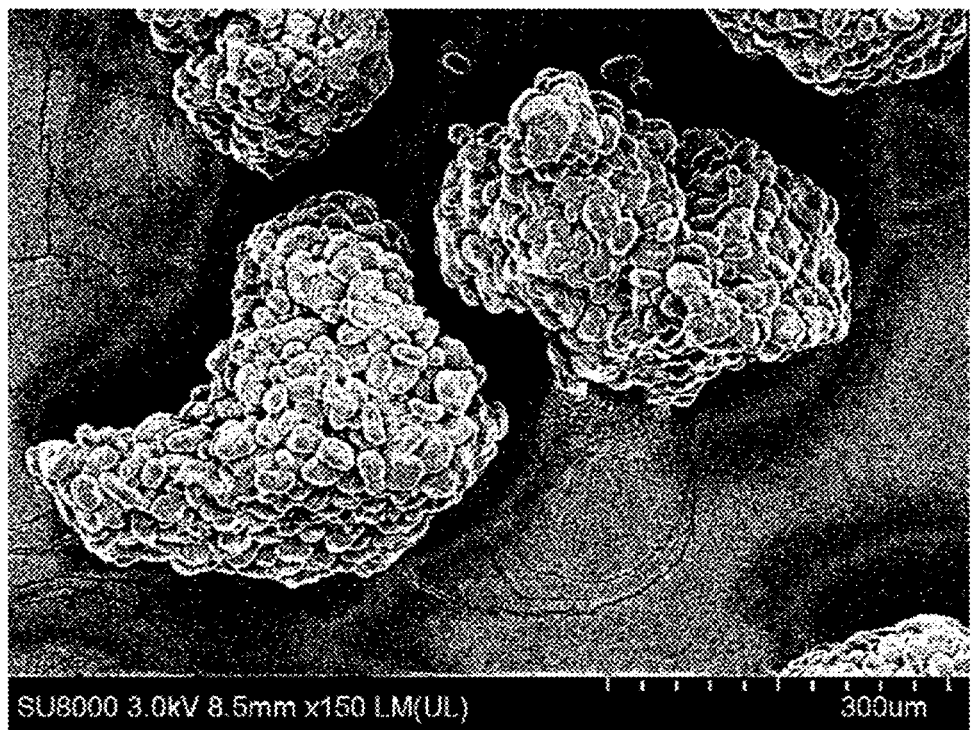
FIGS. 3 to 6 are scanning electron micrograms of a pre-dust analog under 300-micron, 100-micron, 20-micron, and 5-micron augmentations respectively.
Figure 4:
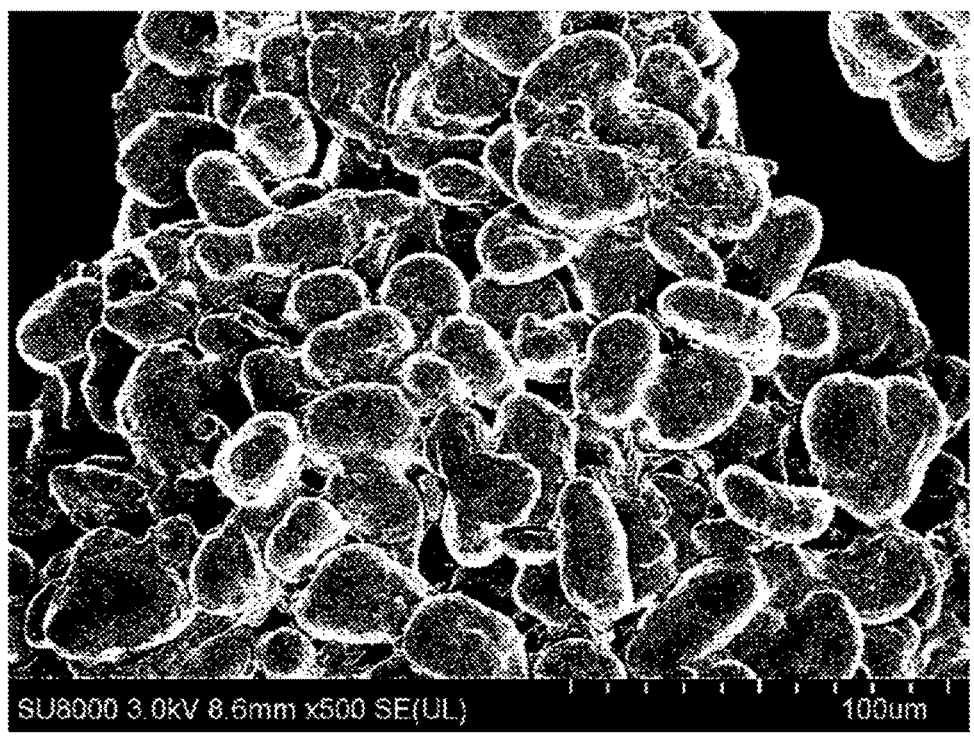
Figure 5:
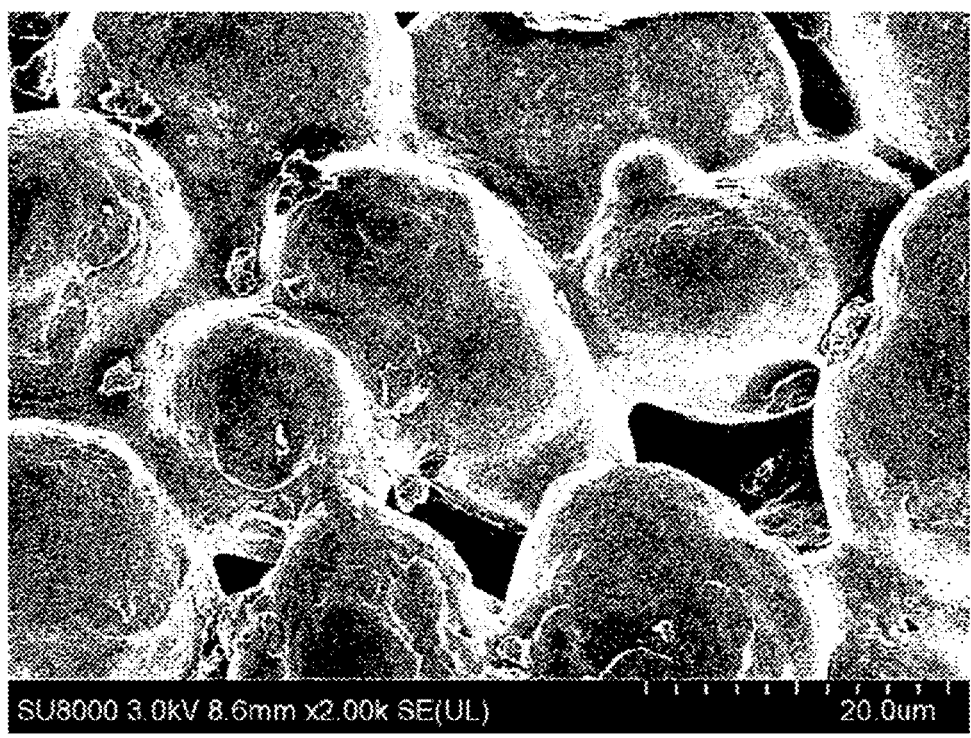
Figure 6:
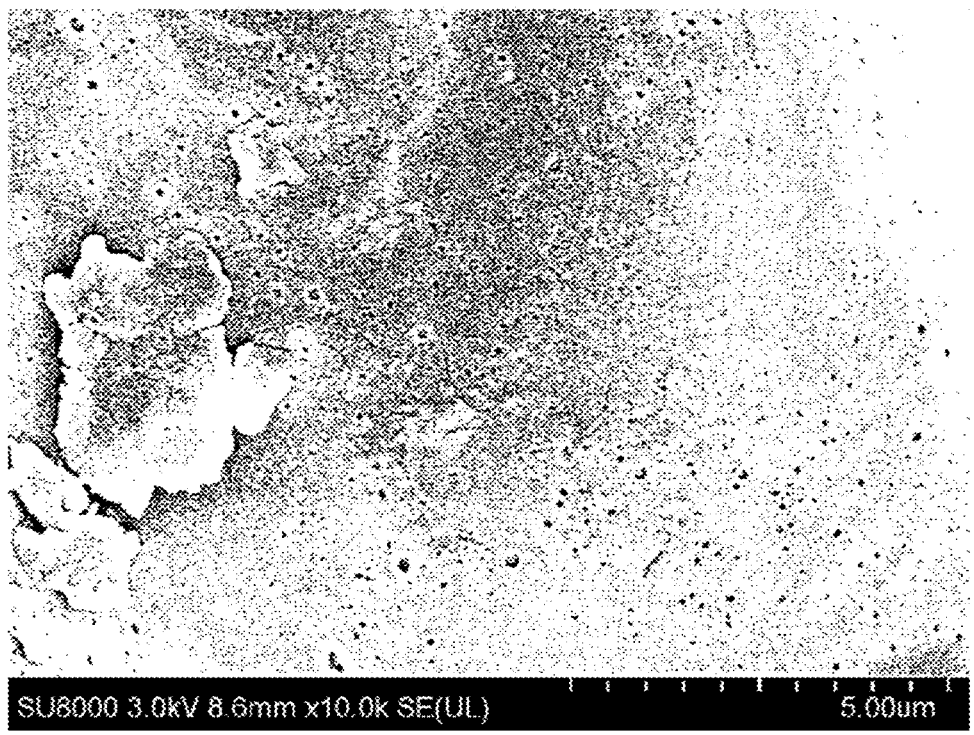

The hydration, heat, moisture treatment, and drying of the limited protein pulse flour fraction reduces levels of volatiles (e.g. hydrocarbons, alcohols, ketones, and/or aldehydes) as well as inactivates bitterness compounds (e.g. saponins, lectins and phenolics) improving the taste, flavour, and/or aroma. In particular, a sensory evaluation comparison presented in FIG. 2 demonstrates the altered taste, flavor, and/or aroma characteristics between the pulse flour and the heat and moisture treated pulse flour. In particular, a pulse taste has been reduced from a strong taste (e.g. 8) to a more mild pulse taste (e.g. 3). The bitterness has also been reduced by half (e.g. from 6 to 3). During the heat and moisture treatment, a roasted flavor may be introduced (e.g. from 0 to 3) into the pulse flour, which may be preferable to the pulse taste for a consumer.

The agglomerated pulse dough pieces may be sifted and/or milled 110 into coarse (e.g. over 2362 micron), granular (e.g. between 800 micron to 2362 micron), and fine (e.g. less than 297 micron) as typical fractions. The agglomerated pulse dough may be milled 110 using a fine grinding system such as, for example, an ACM mill, pin mill, turbo jet mill, roller mill or any fine grinding system, and passed through a standard US 100 mesh.

When the bread crumb, coating, pre-dust analog products described herein are used; allergen free, gluten free and single ingredient claims may be imparted. The bread crumbs, coating, and/or pre-dust analog may be applied to fried foods (e.g. breaded chicken, chicken nuggets, shrimp, fish, and/or fries). The resulting fried product may not be too hard based on internal sensory evaluation in oral sensation of coating and may maintain a crispy sensation for about 2-hours in fresh applications and 6-months in frozen applications. The bread crumb may also be mixed into sausage, meatballs, snack foods and/or bakery products and may also be mixed with cereal materials such as trail mixes, soups, and/or granola bars in dairy food systems.

According to an aspect, the pulse-based bread crumb, coating, or pre-dust may be applied as a coating to a breaded food product at an inclusion rate from about 1% to about 10% by weight. The food product may comprise a fried chicken nugget, a fried shrimp, a fried fish, a potato product (e.g. French fries), a meat analogue, a texturized analogue, a canned analogue, vegetables, fruits, pickles, and a generic fried food product.

According to another aspect, the pulse-based bread crumb, coating, or pre-dust may be used as a binder in sausage, meatball, snack food, and bakery products at an inclusion rate from 1% to 20%.

One or more nutritional properties of finished bread crumb produced from peas is given in Table 1.

TABLE 1

| Analysis | Level Found | Units | Serving Size (100 g) | Method |
| --- | --- | --- | --- | --- |
| Moisture (Vacuum oven) | 10.0 | % | 10.0 g | AOAC variable |
| Protein | 11.8 | % | 11.8 g | MWL FO14 |
| Fat (Acid Hydrolysis) | 1.2 | % | 1.2 g | AOAC 922.06 (mod) |
| Saturated fatty acids | 17.2 | % of fat | 0.2 g | AOAC 996.06 |
| Mono-unsaturated fatty acids | 26 | % of fat | 0.3 g | AOAC 996.06 |
| Poly-unsaturated fatty acids | 56.7 | % of fat | 0.7 g | AOAC 996.06 |
| Trans fatty acids (total) | 0.1 | % of fat | 0 g | AOAC 996.06 |
| Ash | 2 | % | 2 g | MWL FO 022 |
| Carbohydrates | 80.1 | % | 80.1 g | Calculation |
| Sucrose | 2.3 | % sugar | 2.3 g | AOAC 982.14C (mod) |
| Total Sugars | 2.3 | % sugar | 2.3 g | Calculation |
| Dietary fiber (total) | 4.6 | % | 4.6 g | AOAC 991.43 (mod) |
| Dietary fiber (insoluble) | 4.6 | % | 4.6 g | AOAC 991.43 (mod) |
| Calories | | | 378 | 21 CFR PART 101.9 (CALC) |
| Sodium (total) | 31 | ppm | 3 mg | AOAC 2011.14 (mod) |
| Potassium (total) | 6560 | ppm | 656 mg | AOAC 2011.14 (mod) |
| Calcium (total) | 206 | ppm | 20.6 mg | AOAC 2011.14 (mod) |
| Iron (total) | 41 | ppm | 4.1 mg | AOAC 2011.14 (mod) |
| Aspartic acid | 1.45 | % | 1450 mg | AOAC 994.12 (Alt. III) |
| Threonine | 0.48 | % | 480 mg | AOAC 994.12 (Alt. III) |
| Serine | 0.59 | % | 590 mg | AOAC 994.12 (Alt. III) |
| Glutamic acid | 2.16 | % | 2160 mg | AOAC 994.12 (Alt. III) |

TABLE 1-continued

| Analysis | Level Found | Units | Serving Size (100 g) | Method |
|---|---|---|---|---|
| Proline | 0.52 | % | 520 mg | AOAC 994.12 (Alt. III) |
| Glycine | 0.83 | % | 830 mg | AOAC 994.12 (Alt. III) |
| Alanine | 0.54 | % | 540 mg | AOAC 994.12 (Alt. III) |
| Cystine | 0.23 | % | 230 mg | AOAC 994.12 (Alt. III) |
| Valine | 0.57 | % | 570 mg | AOAC 994.12 (Alt. III) |
| Methionine | 0.11 | % | 110 mg | AOAC 994.12 (Alt. III) |
| Isoleucine | 0.54 | % | 540 mg | AOAC 994.12 (Alt. III) |
| Leucine | 0.86 | % | 860 mg | AOAC 994.12 (Alt. III) |
| Tyrosine | 0.41 | % | 410 mg | AOAC 994.12 (Alt. III) |
| Phenylalanine | 0.59 | % | 590 mg | AOAC 994.12 (Alt. III) |
| Lysine (total) | 0.86 | % | 860 mg | AOAC 994.12 (Alt. III) |
| Histidine | 0.28 | % | 280 mg | AOAC 994.12 (Alt. III) |
| Arginine | 0.92 | % | 920 mg | AOAC 994.12 (Alt. III) |
| Tryptophan | 0.14 | % | 140 mg | AOAC 994.12 (Alt. III) |
| Fiber-Sugar Sum | 6.9 | % | 6.9 g | Calculation |
| Zinc (total) | 15.1 | ppm | 1.5 mg | AOAC 2011.14 (mod) |
| Sulfur (total) | 932 | ppm | 93.2 mg | AOAC 2011.14 (mod) |
| Phosphorus (total) | 2050 | ppm | 205 mg | AOAC 2011.14 (mod) |
| Manganese (total) | 5 | ppm | 0.5 mg | AOAC 2011.14 (mod) |
| Magnesium (total) | 523 | ppm | 52.3 mg | AOAC 2011.14 (mod) |
| Copper (total) | 3.9 | ppm | 0.4 mg | AOAC 2011.14 (mod) |
| Molybdenum (total) | 1.17 | ppm | 0.1 mg | USP <233> |
| Starch (total) | 68.63 | % | 68.6 g | AACC 76-11 (mod) |
| Selenium (total) | 0.26 | ppm | 0 mg | USP <233> |

The temperature ranges described herein may be appropriate for an altitude of 560 m above sea level. One of skill in the art may adjust the temperatures according to the altitude where the processes described herein may be performed.

A viscosity profile of pulse based crumb, coating and pre-dust was given in Table 2, which presents attributes of the pulse-based bread crumb, coating, and pre-dust products as measured by a rapid visco analyzer.

TABLE 2

| Pulse Product | Peak Viscosity (cP) | Hot Paste Viscosity (cP) | Break-down (cP) | Cold Paste Viscosity (cP) | Setback (cP) | Peak Time (mm) | Pasting Temperature (° C.) |
|---|---|---|---|---|---|---|---|
| Bread Crumb | 401 | 209 | 193 | 890 | 725 | 1.3 | 50.2 |
| Coating | 2205 | 1985 | 220 | 4427 | 2442 | 6.6 | 52.0 |
| Pre-Dust | 2597 | 2356 | 241 | 4091 | 1735 | 5.2 | 76.7 |

Although the aspects described herein demonstrate a dehulling 102 step, other aspects may perform fine milling 104 on the hulled pulses (or a portion of the hulled pulses) in order to provide a bread crumb product with additional fiber.

The results imaged by a scanning electron microscope of the pre-dust samples are presented in FIGS. 3-6. The agglomeration and/or partially cooking/gelatinization of starch granules may be observed.

Any and all of the aspects described herein may be combined in any and all combinations such as dehulling, milling, air classification, steam treatment, deflavoring, milling, sifting which is consistent with the understanding of those skilled in the art on review of the present description. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A method of manufacturing a pulse-based bread crumb, coating, or pre-dust from pulses comprises:
   separating, using classification, a raw pulse flour into a limited protein pulse flour fraction having a limited protein range of less than about 16% protein by dry weight and a medium protein pulse flour fraction having a medium protein range of about 20% to about 36% by dry weight;
   hydrating, in a reactor, a blended protein pulse flour comprising the limited protein pulse flour fraction and the medium protein pulse flour fraction blended to a blended protein range from 7% to 24% by weight and between about 18% to about 55% by weight of water, the water having a water temperature range of about 30° C. to 90° C. at atmospheric pressure, to produce a hydrated pulse dough having a dough temperature range of about 70° C. to about 85° C.;
   agglomerating the hydrated pulse dough to produce agglomerated pulse dough;
   heating the agglomerated pulse dough at 95° C. to 150° C. cooked and dried to a moisture content of less than about 12% by weight moisture;
   sifting the agglomerated pulse dough into coarse pieces of over about 2362 micron size, granular pieces of between about 297 to about 2362 micron size, and fine pieces of less than about 297 micron; and producing a food product using at least one of the course pieces, the granular pieces, and the fine pieces.

2. The method according to claim 1, further comprises milling at least one dehulled pulse to produce the raw pulse flour.

3. The method according to claim 2, further comprises dehulling at least one hulled pulse prior to milling to produce the at least one dehulled pulse and at least one outer hull.

4. The method according to claim 3, further comprises cleaning the at least one hulled pulse.

5. The method according to claim 2, wherein the raw pulse flour comprises particle sizes of below about 80 microns.

6. The method according to claim 2, wherein the raw pulse flour comprises particle sizes of below about 150 microns.

7. The method according to claim 1, wherein the food product is produced by applying the at least one of the course pieces, the granular pieces, and the fine pieces to an exterior surface of the food product.

8. The method according to claim 7, wherein the food product is selected from at least one of chicken, shrimp, fish, potatoes, meat analogues, texturized analogues, canned analogues, vegetables, fruits, and pickles.

9. The method according to claim 1, wherein the food product is produced by binding the at least one of the course pieces, the granular pieces, and the fine pieces within the food product.

10. The method according to claim 9, wherein the food product is selected from at least one of sausage, meatballs, snack foods, and bakery products.

* * * * *